(12) United States Patent
Grobbel

(10) Patent No.: US 6,655,699 B2
(45) Date of Patent: Dec. 2, 2003

(54) SIX JAW EQUALIZING CHUCK

(75) Inventor: Thomas Michael Grobbel, Ortonville, MI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/044,101

(22) Filed: Jan. 11, 2002

(65) Prior Publication Data

US 2003/0132583 A1 Jul. 17, 2003

(51) Int. Cl.⁷ ............................................ B23B 31/16
(52) U.S. Cl. ..................... 279/132; 279/130; 279/118
(58) Field of Search ........................ 279/109–110, 129, 279/130–131, 132, 133, 106–108, 123

(56) References Cited

U.S. PATENT DOCUMENTS

| | | | | |
|---|---|---|---|---|
| 3,069,181 A | * | 12/1962 | Hohwart et al. | 279/106 |
| 3,082,015 A | * | 3/1963 | Hohwart et al. | 279/106 |
| 3,099,457 A | * | 7/1963 | Hohwart et al. | 279/106 |
| 3,104,886 A | * | 9/1963 | Hohwart et al. | 279/106 |
| 3,365,206 A | * | 1/1968 | Hohwart et al. | 279/106 |
| 3,380,747 A | * | 4/1968 | Hohwart et al. | 279/106 |
| 3,423,098 A | * | 1/1969 | Hohwart et al. | 279/109 |
| 3,945,654 A | | 3/1976 | McMullen | |
| 4,465,289 A | * | 8/1984 | Banks | 279/121 |
| 4,824,126 A | | 4/1989 | Martin | |
| 5,135,242 A | | 8/1992 | Toth | |
| 5,137,287 A | | 8/1992 | Hsu | |
| 5,184,833 A | * | 2/1993 | Cross et al. | 279/106 |
| 5,322,305 A | | 6/1994 | Cross et al. | 279/124 |
| 5,409,242 A | * | 4/1995 | Gonnocci | 279/106 |
| 5,941,538 A | * | 8/1999 | Gonnocci | 279/132 |
| 6,206,382 B1 | * | 3/2001 | Gonnocci | 279/132 |
| 6,454,278 B1 | * | 9/2002 | Wrobel et al. | 279/130 |

* cited by examiner

*Primary Examiner*—Steven C. Bishop
(74) *Attorney, Agent, or Firm*—Harness, Dickey & Pierce, P.L.C.

(57) ABSTRACT

An equalizing chuck assembly for heavy duty application includes a chucking assembly having a plurality of rocker arms operably connected to an actuator by a plurality of toggle links. Jaw members are disposed on one end of the rocker arms and a counterweight is disposed on an opposite end of the rocker arms. The equalizing chuck assembly utilizes a plurality of equalizing plates interconnected between the actuator and the rocker arm to provide a degree of adjustment to accommodate eccentricities within the workpiece to be held by the chucking assembly.

24 Claims, 7 Drawing Sheets

SIX JAW EQUALIZING CHUCK

FIELD OF THE INVENTION

The present invention relates generally to a work holding chuck assembly for use in high speed machining applications, and more specifically to an equalizing chuck assembly including multiple sets of rocker arms having a jaw support located at one end and a counterweight located at an opposite end therefrom. A centrally-located axially moveable actuator is operably coupled to the rocker arms by an equalizer plate and a toggle link such that the equalizer plate moves the toggle link to rotate the rocker arm, thereby positioning the jaw supports radially inwardly and outwardly.

BACKGROUND OF THE INVENTION

An adjustable chuck of the type in widespread use for gripping workpieces of different sizes typically includes a number of internal moving parts which serve to open and close the gripping jaws. Smooth operation of these parts is most important to assure that a positive clamping of the workpiece is achieved when the jaws are closed, and further that each of the jaws applies equal pressure against a workpiece to prevent distortion and possible eccentric location of the workpiece.

There has been a recent trend to require power chucks to operate at significantly higher rotational speeds. As such, the rotational balance of the chuck and the workpiece held within the chuck becomes increasingly important. At the speeds at which many chucks are used in modern manufacturing processes, even slight eccentricities or out of balance is unwanted. For example, an imbalance may cause improper machining which results in rejection of the workpiece. Alternately, an imbalance may create a change in the gripping force as a result of the centrifugal force created by the rotation of the jaw supports. Thus, it is desirable to provide a chuck which maintains a proper balance and constant gripping force independent of rotational speed in which is readily adjustable to insure concentric alignment with the machine tool.

SUMMARY OF THE INVENTION

The present invention provides a six jaw countercentrifugal rocker arm chuck assembly for use in either ID or OD chucking applications. The chuck assembly includes multiple rocker arms pivotally coupled to the chuck housing. Each rocker arm has a jaw member disposed on one end and a counterweight disposed on the opposite end. An actuator is supported for axially movement in the chuck housing. Equalizing plates are coupled to the actuator for concurrent axial movement therewith, while permitting a degree of rotational freedom or yaw within the chuck housing. A toggle link interconnects each of the rock arms to an associated equalizing plate such that axial movement of the actuator pivots the rocker arms thereby moving the jaw members between an open position and a closed position. Yawing motion of the equalizing plates moves the rocker arms relative to one another to accommodate eccentricities in the workpiece.

Further areas of applicability of the present invention will become apparent from the detailed description provided hereinafter. It should be understood that the detailed description and specific examples, while indicting the preferred embodiment of the invention, are intended for purposes of illustration only and not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 6:
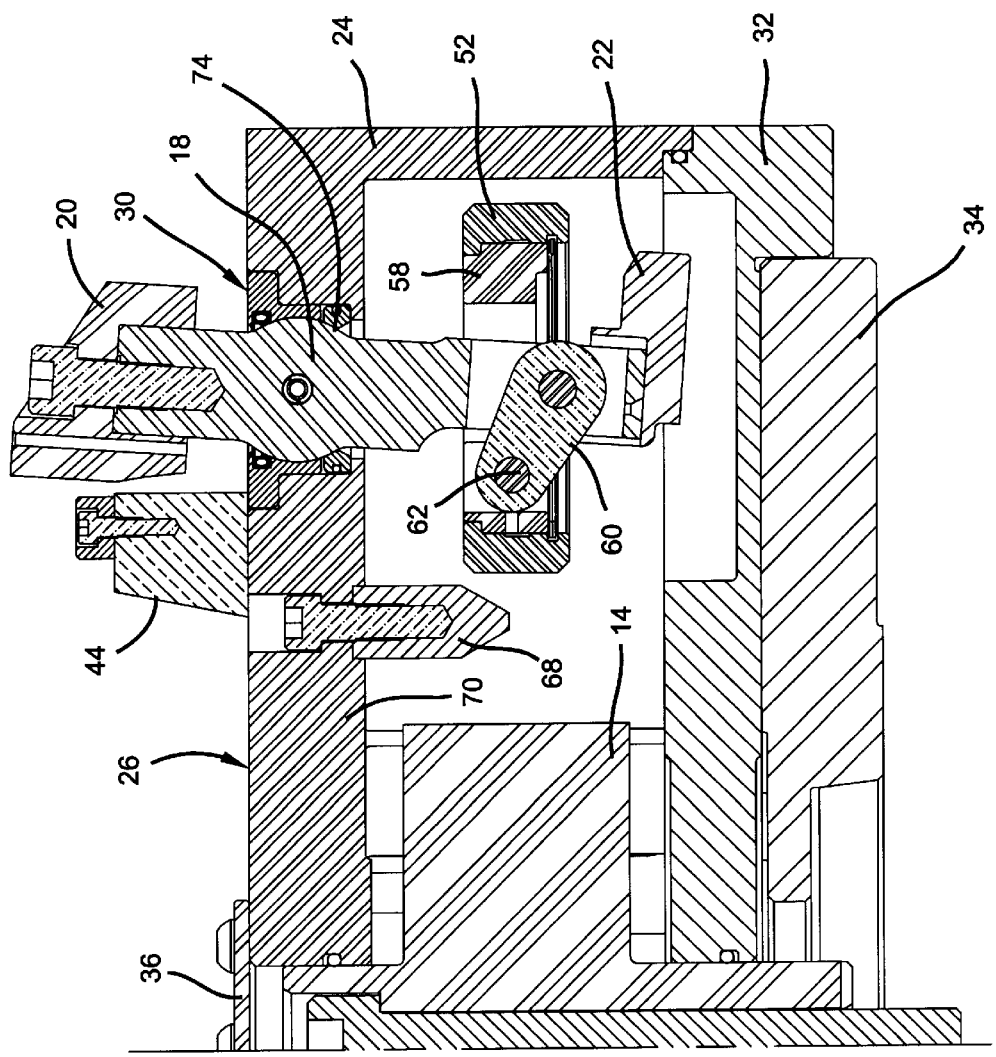
FIG. 6 is a detailed cross sectional view taken through the equalizing chuck assembly showing the rocker arms in an open position.

With reference now to the drawings, an equalizing chuck assembly 10 includes a housing subassembly 12, an actuator 14 supported for axial movement in the housing and a chucking subassembly 16 disposed within housing subassembly 12 and operably coupled to actuator 14. Chucking subassembly 16 includes a plurality of rocker arms 18 pivotally coupled to housing subassembly 12 to rotate about a pivot axis. Each rocker arm 18 has a jaw member 20 secured to one end and a counterweight 22 secured to an opposite end. Jaw member 20 and counterweight 22 balance rocker arm 18 about the pivotal axis. Jaw members 20 are configured to minimize mass while at the same time provide adequate strength and stiffness for a given chucking application. The upper portion of rocker arm 18 has a cylindrical surface formed thereon which is received in a blind bore formed in the bottom of jaw member 20. A screw secures jaw member 20 to rocker arm 18. As best seen in FIG. 6, the screw is eccentrically located with respect to the longitudinal axis of rocker arm 18. In this manner, the screw is not susceptible to loosen upon rotation of rocker arm 18 and jaw marker 20 as chucking assembly 16 conforms to a chucked part (not shown).

Counterweights 22 are configured to balance the mass associated with jaw members 20. Counterweights 22 are generally D-shaped in plan view and oriented such that the mass is primarily located radially outboard of rocker arm 18. An advantage may be gained by locating a majority of the counterweight mass further away from the center of rotation of equalizing chuck assembly 10, thereby maximizing the counterbalance effect for a given mass.

In the presently preferred embodiment, equalizing chuck assembly 10 includes six rocker arms 18 pivotally coupled to housing subassembly 12. A skilled practitioner will readily recognize that equalizing chuck assembly 10 may be adapted to use more or less rocker arms 18 in chucking subassembly 16. As described in detail hereinafter, chucking subassembly 16 is operably coupled to actuator 14 such that axial movement of actuator 14 pivots rocker arms 18, thereby moving jaw members 20 between an open position and a closed position.

Figure 1:
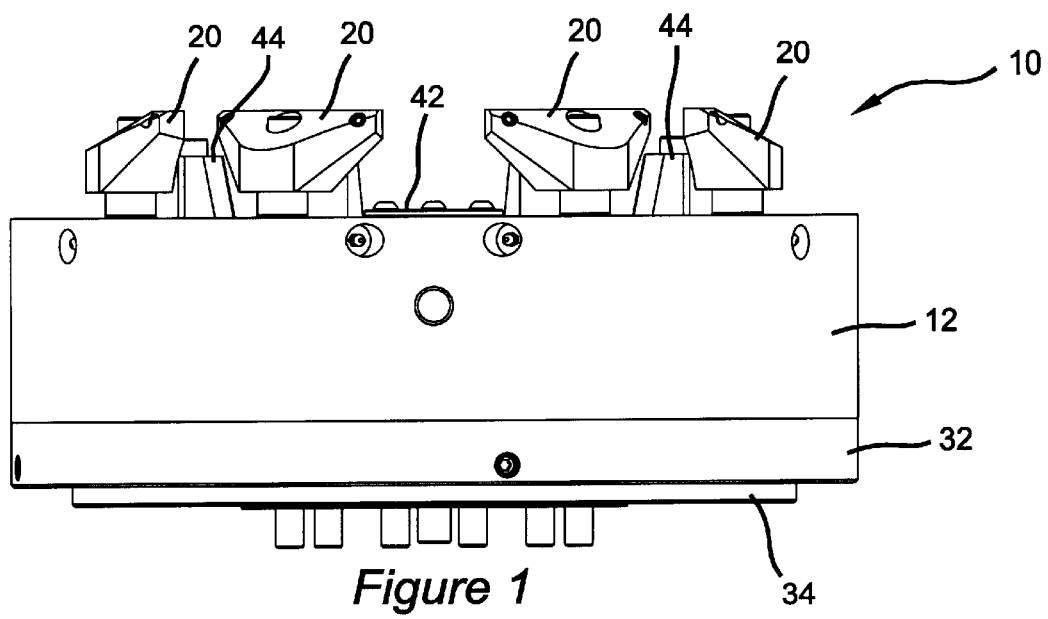
FIG. 1 is a side elevational view of an equalizing chuck assembly in accordance with the present invention.
Figure 2:
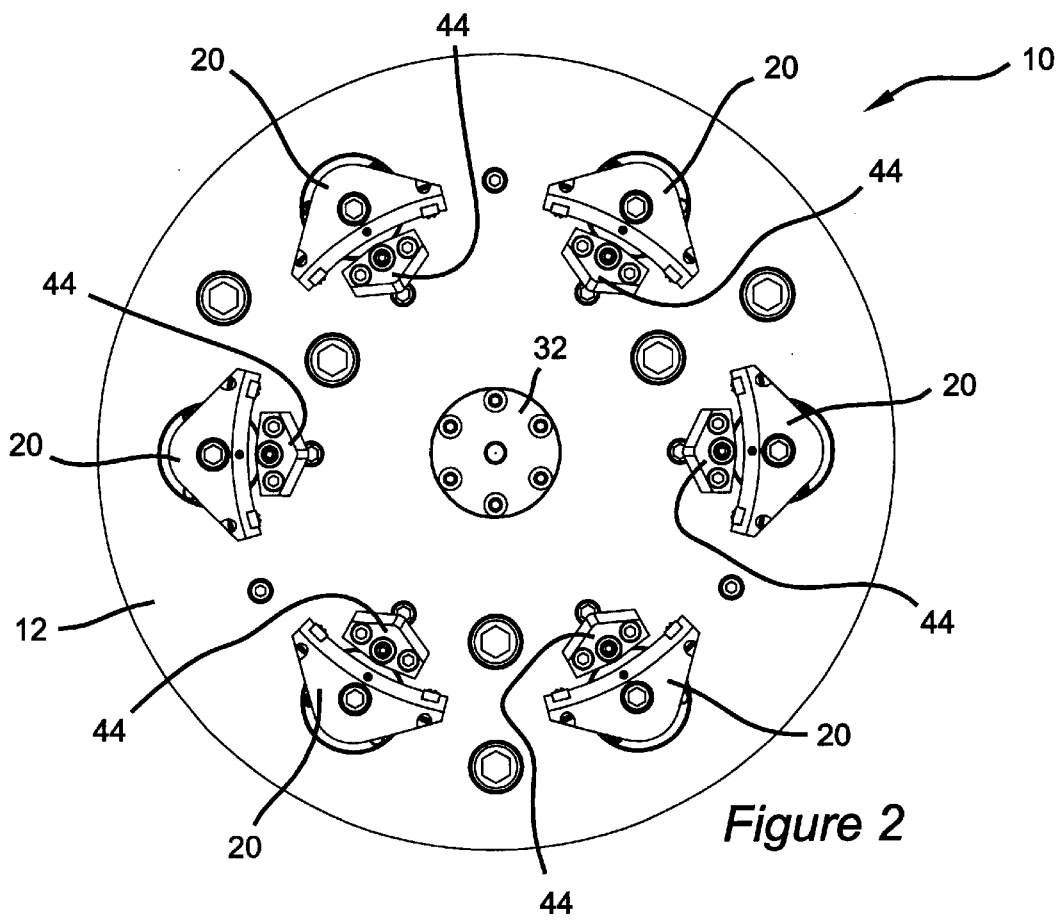
FIG. 2 is a top plan view of the equalizing chuck assembly illustrated in FIG. 1.
Figure 3:
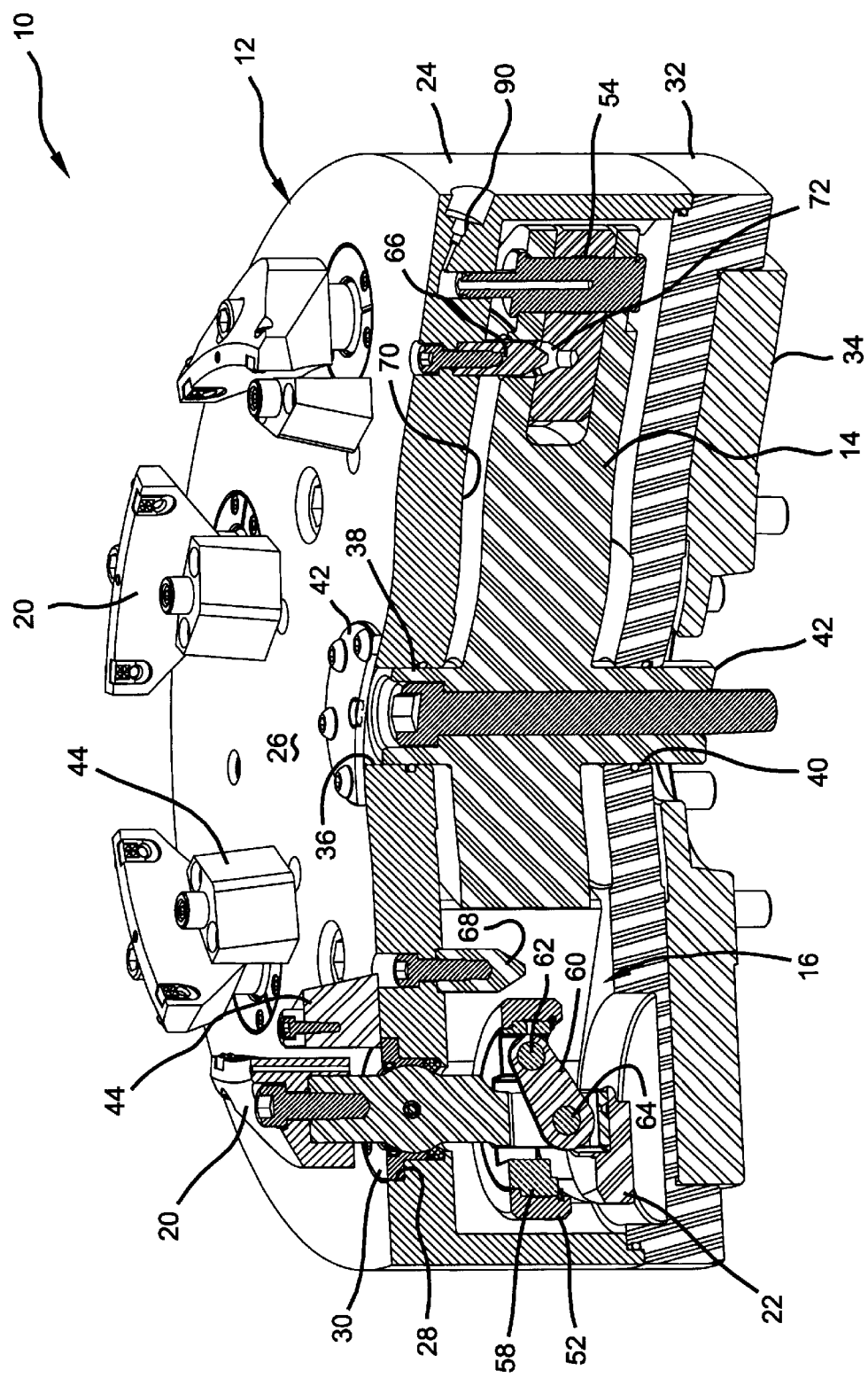
FIG. 3 is a perspective view showing a partial cross section of the components of the equalizing chuck assembly illustrated in FIG. 1.
Figure 4:
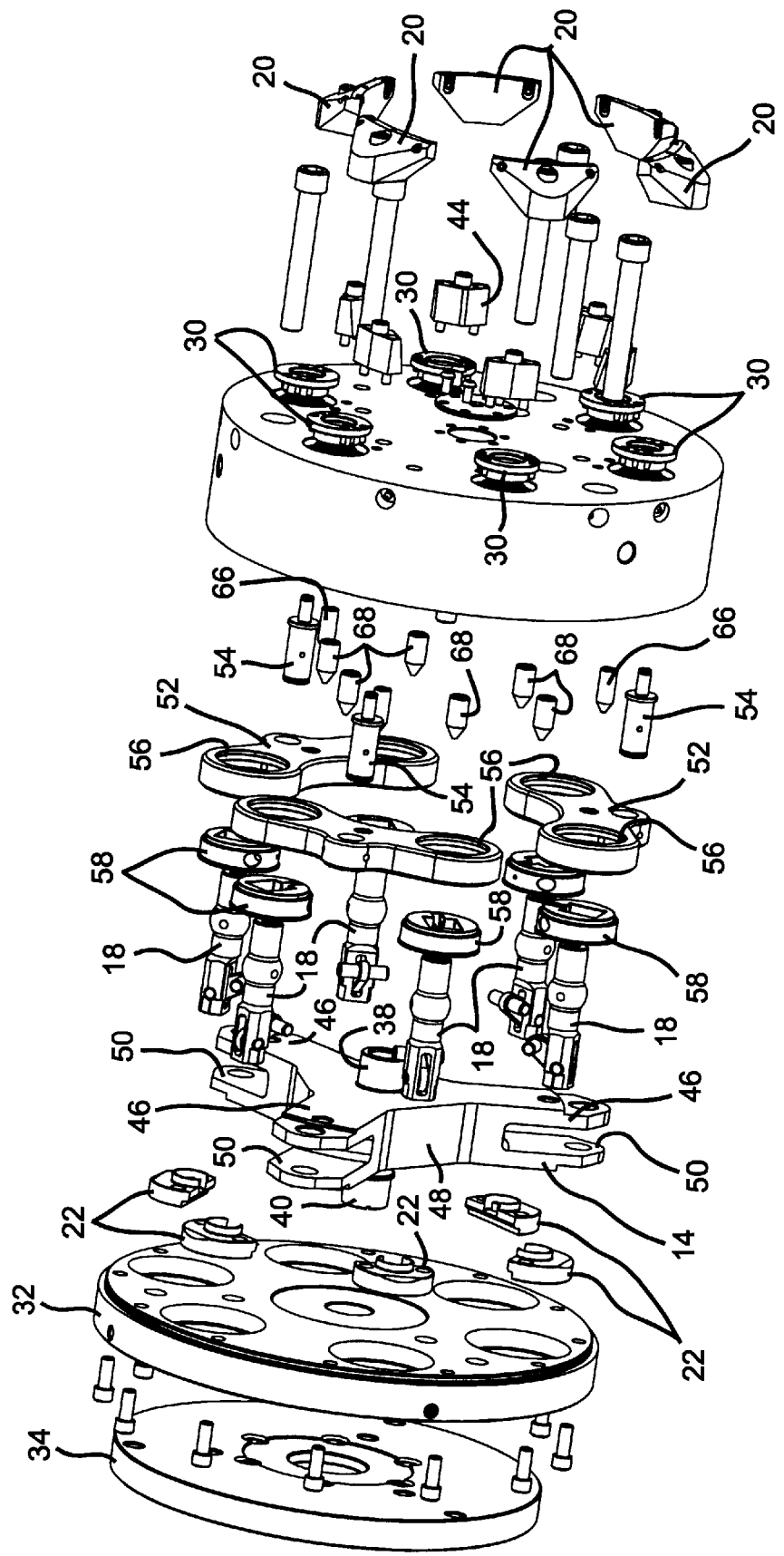
FIG. 4 is an exploded perspective view of the main components of the equalizing chuck assembly illustrated in FIG. 1.

With reference now to FIGS. 3 and 4, housing subassembly 12 includes housing body 24 defining a front face 26. A plurality of apertures 28 are formed in front face 26 and receive upper bearing assembly 30 for pivotally coupling rocker arms 18 to housing body 24. Housing subassembly 12 further includes adapter plate 32 secured in a sealing arrangement to housing body 24. A subadapter plate 34 may be secured to adapter plate 32 for providing the proper bolt pattern for securing equalizing chuck assembly 10 to an appropriate lathe or other machining apparatus (not shown).

Front face 26 of housing body 24 has a central bore 36 formed therethrough which is adapted to receive a hub 38 formed on actuator 14. Similarly, adapter plate 32 has a central bore 40 formed therethrough to receive hub 42 formed on actuator 14. In this manner, actuator 14 is supported for axial movement in housing subassembly 12. A cover plate 42 is disposed over central bore 36 of front face 26 to prevent debris and other contamination from entering into housing subassembly 12. A plurality of work stops 44 are secured to front face 26 of housing body 24. Work stops 44 cooperate with jaw members 20 to support a workpiece being gripped by equalizing chuck assembly 10.

With reference now to FIG. 4, actuator 14 has three arms 46 extending equal angularly from a central portion 48. A slot 50 is formed at the end of actuator arms 46 and receive an equalizing plate 52 which is pivotally coupled to actuator arms 46 by pivot pin 54. In this manner, equalizer plate 52 moves axially with actuator 14 within housing subassembly 12 but is permitted to rotate (i.e., yaw) relative to actuator arms 46. As presently preferred, equalizing chuck assembly 10 includes three equalizer plates 52, each coupled to an associate actuator arm 46 of actuator 14. Specifically, equalizing plate 52 has a pair of apertures 56 formed therethrough which receives a lower bearing assembly 58 located adjacent the lower end of rocker arm 18. Lower bearing assembly 58 is interconnected to the lower end of rocker arm 18 by a toggle link 60. More specifically, lower bearing assembly 58 includes a clevis pin 62 pivotally connecting a first end of toggle link 62 to lower bearing assembly 58. Rocker arm 18 includes a clevis pin 64 pivotally connecting toggle link 60 thereto. As equalizing plate 52 pivots about pivot pin 54, lower bearing assembly 58 rotates in aperture 56 to so that toggle link 60 and clevis pin 62 maintain a proper orientation with rocker arm 18.

A plurality of tapered centralizing pin 66, 68 extends from an interior face 70 of housing body 24. A first set of pins 66 cooperate with a tapered bore 72 is formed in equalizing plate 52 to locate equalizing plate 52 in a centered position as hereinafter described when jaw members 20 are in an opened position. A second set of pins 68 provide stop means for limiting the rotational movement of equalizing plates 52 with respect to actuator 14. Pins 68 are located to engage an inner radial surface of equalizer plate 52. Alternately, the configuration and dimension of equalizer plate 52 may be arranged such that an outer radial surface of equalizer plate 52 contacts the inner wall of housing 12, thereby providing such stop means to limit travel of equalizer plate 52. As presently preferred, equalizer plate 52 has a travel of ±0.13 inches or approximately ±2° rotation. However, a skilled practitioner will recognize that the travel of equalizer plate 52 may be adjusted in accordance to the requirements of a given application.

Figure 5:
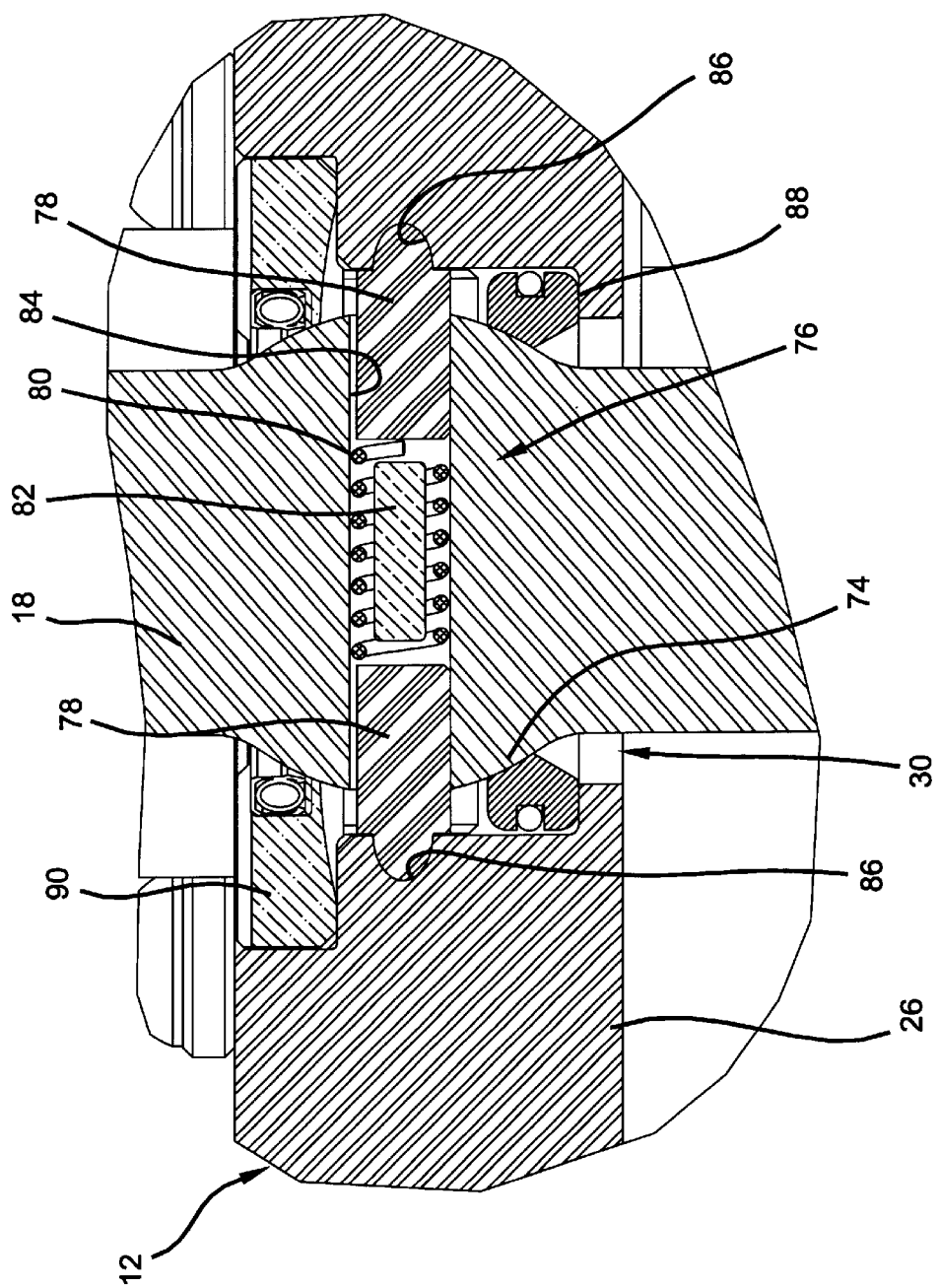
FIG. 5 is a detailed cross sectional view illustrating the pivotal interconnection between the rocker arms and the housing of the equalizing chuck assembly in FIG. 1.

With reference now to FIG. 5, the pivotal connection of rocker arm 18 to housing subassembly 12 is further described. Rocker arm 18 includes a spherical center portion 74 defining a bearing surface which cooperates with upper bearing assembly 30. Pivot assembly 76 including a pair of homing pins 78, a homing spring 80 and a restrictor rod 82 extending through aperture 84 formed in rocker arm 18 and into blind bore 86 formed in housing body 24. Upper bearing assembly 30 includes upper bearing seat 88 and lower being seat 90 disposed in aperture 28 to support rocker arm 18 for pivotal motion about pivot assembly 76. In this manner, pivot assembly 76 constrains the rotational movement of rocker arm 18, while upper bearing assembly 30 reacts the clamping loads imposed on rocker arm 18.

Figure 7:
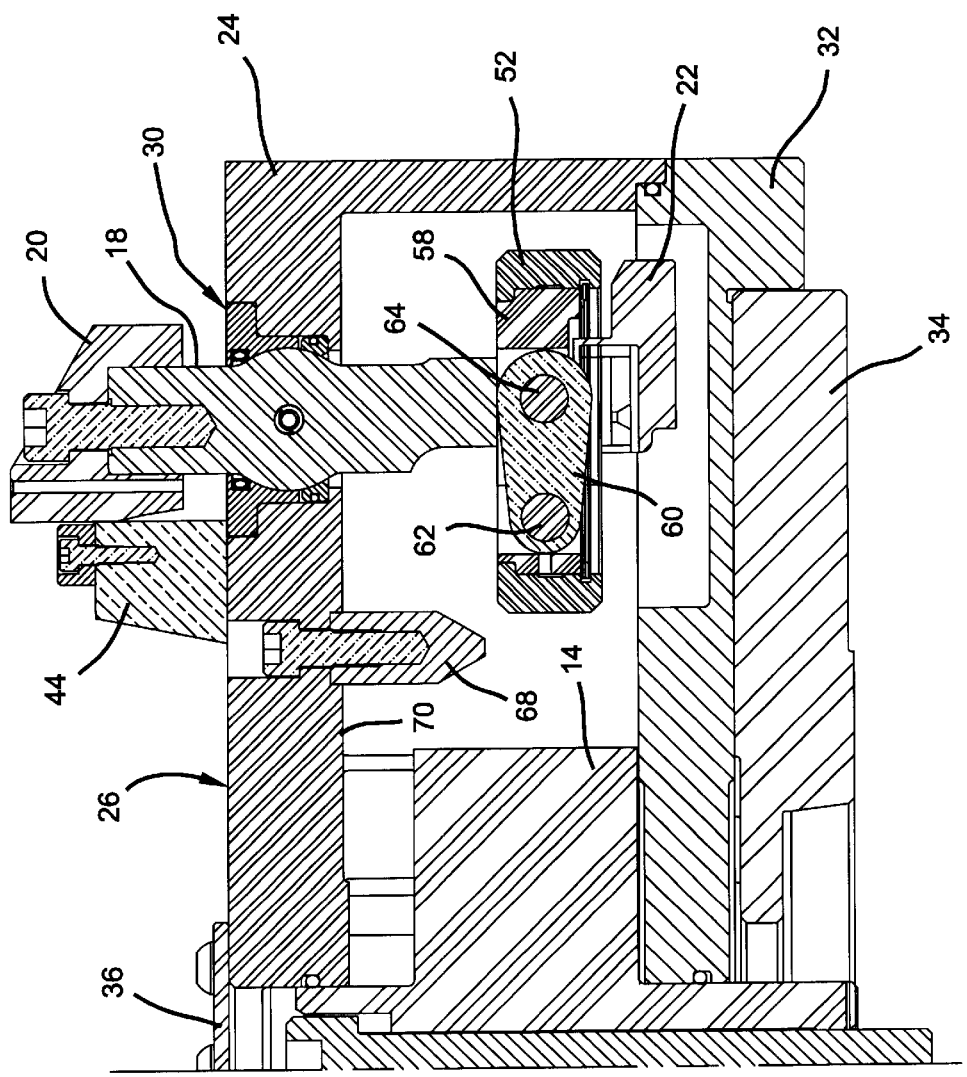
FIG. 7 is a detailed cross sectional view similar to FIG. 6 showing the rocker arms in a closed position.
Figure 8:
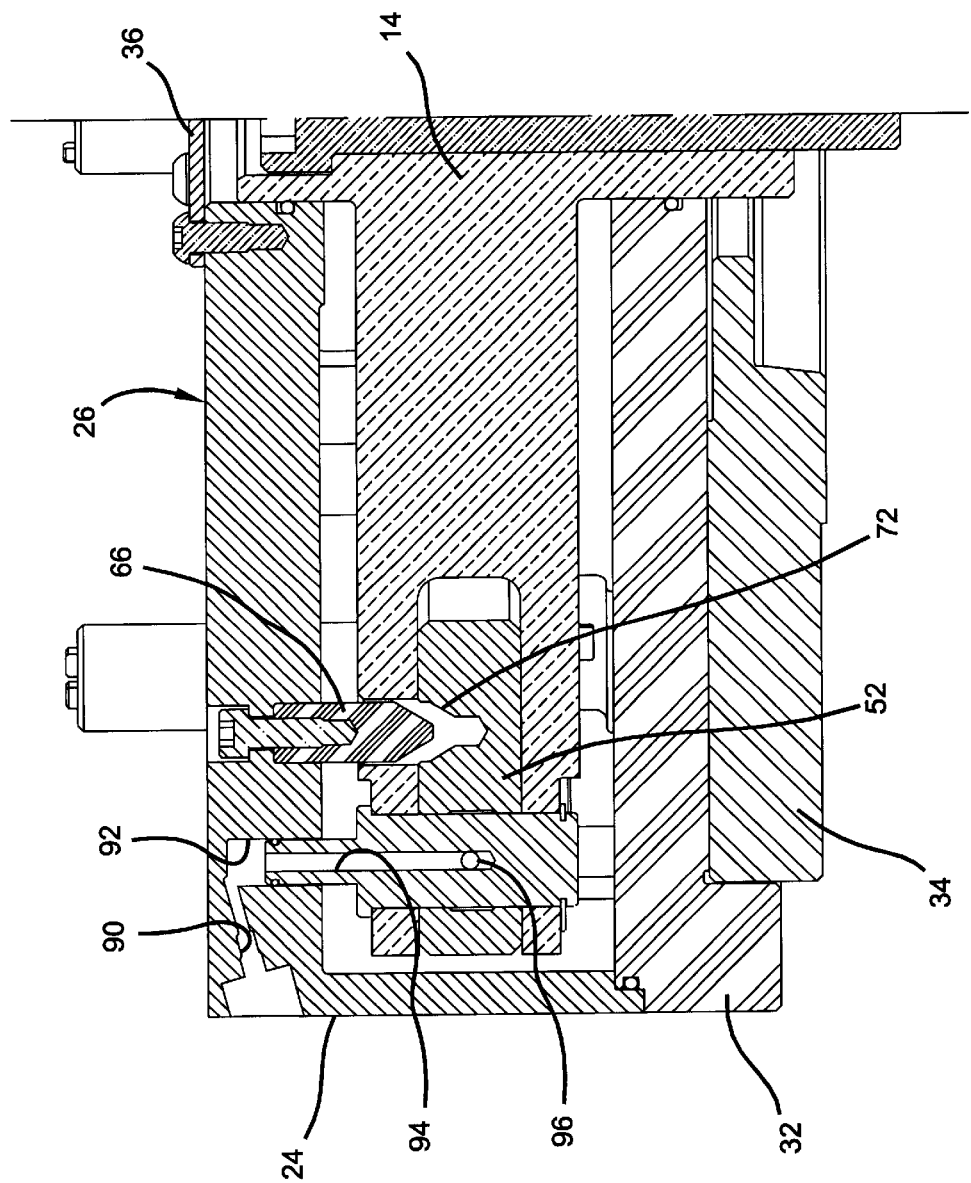
FIG. 8 is a detailed cross sectional view illustrating the pivotal connection between the actuator and the equalizing plate.

With reference now to FIGS. 6 and 7, the kinematics of equalizing chuck assembly 10 will now be described. With jaw members 20 in an open position as illustrated in FIG. 6, actuator 14 is positioned forwardly (i.e., towards front face 26) within housing body 24. Equalizer plates 52 are likewise positioned forwardly within housing body 24. As a result, toggle link 60 is rotated clockwise (as seen in FIG. 6) with respect to clevis pin 64 causing rocker arm 18 to rotate clockwise about pivot assembly 76, thereby moving jaw member 20 to an open position. With actuator 14 moved forwardly, the tapered surface of centralizing pin 66 engages tapered bore 72 formed in equalizing plate 52 as best seen in FIG. 8. In this manner, centralizing pin 68 moves equalizing plate 52 to a nominally centered position with respect to actuator 14.

To close jaw members 20, actuator 14 is pulled axially rewardly (i.e., towards adapter plate 32) causing equalizer plate 52 to move rearwardly. Rearward movement of equalizer plate 52 rotates toggle link 60 in a counterclockwise direction with respect to clevis pin 64. As toggle link 60 rotates counterclockwise, rocker arm 18 also rotates counterclockwise causing jaw member 20 to move radially inwardly towards work stop 44. Actuator 14 is configured so as to contact adaptor plate 32 when jaw member 20 reaches the closed position and functions as a limit for movement of actuator 14, thereby preventing clevis pin 62 from rotating over center with respect to clevis pin 64.

As previously discussed, equalizing chuck assembly 10 is adapted to accommodate slight eccentricities or variations in the clamped part. Equalizing plates 52 function to permit rocker arms 18 and jaw members 20 to move relative to one while being operably coupled to actuator 14. Specifically, equalizer plates 52 yaw with respect to actuator 14 thus moving the lower end of rocker arm 18 radially inwardly or outwardly depending on the direction of rotation. Lower bearing assembly 58 maintains proper alignment of toggle link 60. The relative radial movement of the lower end of rocker arms 18 effects slight positioning of the jaw members 20 of the coupled rocker arms 18.

Equalizing chuck assembly 10 requires lubrication to insure smooth and continuous operation of the moving components therein. Proper management of the lubricate utilized within equalizing chuck assembly 10 is necessary to insure proper lubrication, while at the same time minimizing additional rotational inertia associated with the mass of the lubrication and imbalancing effects thereof. Accordingly, the present invention provides a grease lubrication mechanism which utilizes a minimum amount of lubricant. As best seen in FIG. 3, a grease passageway 90 extends from the outer perimeter of housing body 24 through front face 26 to the blind bore 92 formed therein. A grease fitting (not shown) may be received in grease passageway 90. Pivot pin 54 has an axial bore 94 and a radial bore 96 formed therein (as best seen in FIG. 8) for communicating grease from grease passageway 90 to the interface between pivot pin 54 and equalizing plate 52. In this manner, a minimum amount of grease may be directly delivered to the necessary location.

With reference now to the drawings, the operation of equalizing chuck assembly 10 in an OD chucking application will now be described. Subadapter plate 34 is configured for a specific machining apparatus such that a draw bar (not shown) of such machining apparatus may be secured to actuator 14. Once equalizing chuck assembly 10 is properly secured to the machining apparatus, the housing subassembly 12 is gauged to insure that the chuck assembly 10 is concentrically located on the machining apparatus.

The draw bar may be actuated with respect to the equalizing chuck assembly 10 so as to axially position actuator 14. Such movement of actuator 14 causes actuator 14 and equalizing plates 52 to move axially within housing subassembly 12. Equalizing plates 52 rotates toggle links 60 about clevis pin 64 causing rocker arms 18 to rotate from an opened position to a closed position.

With the workpiece adequately secured, equalizing chuck assembly 10 may be rotated to perform the desired machine operation on the workpiece. By properly balancing the jaw members 20 with counterweight 22, a centrifugal force balance is achieved such that the clamping force generated by equalizing chuck assembly 10 is maintained independent of the rotational speed at which chuck assembly 10 is operated. Once machining of the workpiece is completed, actuator 14 is urged forwardly such that equalizer plates 52 also move forward causing rocker arms 18 to rotate about pivot assembly 76. Such rotation moves jaw members 20 radially outwardly and disengages the workpiece therefrom.

While the operation of equalizing chuck assembly 10 has heretofore been described with respect to an OD chucking operation, one skilled in the art will recognize that the present invention is also suitable for ID chucking applications. Specifically, the screw that secure upper bearing 30 to housing 12 are removed, thereby allowing rocker arm 18, jaw member 20, counterweight 22 and upper and lower bearing assemblies 30, 58 to be rotated 180°. Upper bearing 30 is then re-secured to chuck housing 12 with the screws. In this orientation, movement of actuator 14 operates to move jaw member 20 radially outwardly as required for ID chucking application. Thus, chuck 10 provides OD and ID applications without added expense or complexity.

The present invention provides a relatively inexpensive and relatively easy means by which a high performance, precision equalizing chuck assembly can be adapted for use in high speed applications without adversely effecting the clamping force generated thereby. Furthermore, the present invention provide a simple lubrication system for the chucking assembly. In this manner, the moving components of equalizing chuck assembly are adequately lubricated. Having described a preferred embodiment of the present invention, one skilled in the art will readily recognize the other embodiments of the present invention can be developed within the framework of this disclosure and such embodiments are to be considered within the scope and spirit of the present invention. As such, a skilled practitioner in the art will readily recognize the foregoing discussion and accompanying drawings and claims that changes, modifications and variations can be made in the present invention without departing from the spirit and scope thereof as defined in the following claims.

What is claimed is:

1. A equalizing chuck assembly comprising:
   a housing having a front face;
   a plurality of rocker arms, each of said plurality of rocker arms pivotally coupled to said housing and having a first end extending through said front face and a second end;
   a plurality of jaw members, each of said plurality of jaw members disposed on said first end of each of said plurality of rocker arms;
   a plurality of counterweights, each of said plurality of counterweights integrally attached to said second end of each of said plurality of rocker arms;
   an actuator supported for axial motion in said housing and positionable between a first axial position and a second axial position; and
   a plurality of toggle links, each of said plurality of toggle links operably coupling one of said plurality of rocker arms to said actuator;
   wherein axial movement of said actuator between said first position and said second position pivots said plurality of rocker arms, thereby moving said jaw members between an open position and an closed position.

2. The equalizing chuck assembly of claim 1 further comprising:
   a plurality of equalizing plates pivotally coupled to said actuator with a pivot pin to permit relative rotational movement therebetween; and
   a bearing assembly disposed in each of said plurality of equalizing plates, said toggle link being operably coupled to said bearing assemblies.

3. The equalizing chuck assembly of claim 2 wherein said housing has a passageway formed therein to deliver a lubricant to said pivot pin.

4. The equalizing chuck assembly of claim 2 further comprising a centralizing pin extending from an interior surface said housing, said centralizing pin engaging said equalizing plate when said actuator is moved to said first position.

5. The equalizing chuck assembly of claim 2 wherein each of said plurality of equalizing plates has a pair of rocker arms coupled thereto.

6. The equalizing chuck assembly of claim 1 further comprising a pin extending from an interior surface of said housing, said pin engaging said actuator to maintain a rotational orientation of said actuator within said housing.

7. The equalizing chuck assembly of claim 1 wherein each of said rocker arms has an intermediate spherical portion supported in a bearing assembly disposed in an aperture formed in said front face of said housing.

8. The equalizing chuck assembly of claim 1 further comprising a plurality of stops, each of said plurality of stops disposed on said front face adjacent a corresponding jaw member.

9. The equalizing chuck assembly of claim 1 further comprises an adaptor plate secured to an end of said housing opposite said front face.

10. The equalizing chuck assembly of claim 1 wherein each of said counterweights are generally D-shaped having a flat surface inwardly oriented.

11. The equalizer chuck assembly of claim 1 wherein each of said plurality of jaw members has a bore formed therein, said bore receiving said first end of said rocker arm.

12. A equalizing chuck assembly comprising:
    a housing having a front face;

an actuator supported for axial motion in said housing and positionable between a first axial position and a second axial position;

a first chucking mechanism including a first equalizing plate pivotally connected to said actuator so as to move axially therewith and rotate relative thereto, a first pair of rocker arms pivotally coupled to said housing, each of said first pair of rocker arms having a first end extending through said front face, a second end opposite said first end, a jaw member secured to said first end, a counterweight secured to said second end and a toggle link operably connecting said second end to said first equalizing plate;

a second chucking mechanism including a second equalizing plate pivotally connected to said actuator so as to move axially therewith and rotate relative thereto, a second pair of rocker arms pivotally coupled to said housing, each of said second pair of rocker arms having a first end extending through said front face, a second end opposite said first end, a jaw member secured to said first end, a counterweight secured to said second end and a toggle link operably connecting said second end to said second equalizing plate;

a third chucking mechanism including a third equalizing plate pivotally connected to said actuator so as to move axially therewith and rotate relative thereto, a third pair of rocker arms pivotally coupled to said housing, each of said third pair of rocker arms having a first end extending through said front face, a second end opposite said first end, a jaw member secured to said first end, a counterweight secured to said second end and a toggle link operably connecting said second end to said third equalizing plate;

wherein axial movement of said actuator between said first position and said second position pivots said rocker arms, thereby moving said jaw members between an open position and an closed position.

13. The equalizing chuck assembly of claim 12 wherein each of said first, second and third chucking mechanisms further comprises a pair of bearing assemblies disposed in said equalizing plate, each of said pair of bearing assemblies being operably coupled to a respective rocker arm through a respective toggle link.

14. The equalizing chuck assembly of claim 12 wherein each of said first, second and third chucking mechanisms further comprises a centralizing pin extending from an interior surface of said housing, said centralizing pin engaging said equalizing plate when said actuator is moved to said first position.

15. The equalizing chuck assembly of claim 12 further comprises limit means selectively engaging said equalizing plate for limiting rotational movement thereof with respect to said actuator.

16. The equalizing chuck assembly of claim 15 further comprises a pin extending from an interior surface of said housing, said pin configured to selectively engage said equalizing plate.

17. The equalizing chuck assembly of claim 12 wherein each of said rocker arms has an intermediate spherical portion supported in a bearing assembly disposed in an aperture formed in said front face of said housing.

18. The equalizing chuck assembly of claim 12 further comprising a plurality of stops, each of said plurality of stops disposed on said front face adjacent a corresponding jaw member.

19. The equalizing chuck assembly of claim 12 wherein each of said counterweights are generally D-shaped having a flat surface inwardly oriented.

20. The equalizer chuck assembly of claim 12 wherein each of said plurality of jaw members has a bore formed therein, said bore receiving said first end of said rocker arm.

21. A equalizing chuck assembly comprising:

a housing having a front face;

a plurality of rocker arms, each of said plurality of rocker arms pivotally coupled to said housing and having a first end extending through said front face and a second end;

a plurality of jaw members, each of said plurality of jaw members disposed on said first end of each of said plurality of rocker arms;

a plurality of counterweights, each of said plurality of counterweights disposed on said second end of each of said plurality of rocker arms;

an actuator supported for axial motion in said housing and positionable between a first axial position and a second axial position;

a plurality of equalizing plates pivotally coupled to said actuator with a pivot pin to permit relative rotational movement therebetween, each of said plurality of equalizing plates having a bearing assembly disposed therein;

a plurality of toggle links, each of said plurality of toggle links operably coupling one of said plurality of rocker arms to said actuator through said bearing assembly;

wherein axial movement of said actuator between said first position and said second position pivots said plurality of rocker arms, thereby moving said jaw members between an open position and an closed position.

22. The equalizing chuck assembly of claim 21 wherein said housing has a passageway formed therein to deliver a lubricant to said pivot pin.

23. The equalizing chuck assembly of claim 21 further comprising a centralizing pin extending from an interior surface said housing, said centralizing pin engaging said equalizing plate when said actuator is moved to said first position.

24. The equalizing chuck assembly of claim 21 wherein each of said plurality of equalizing plates has a pair of rocker arms coupled thereto.

* * * * *

UNITED STATES PATENT AND TRADEMARK OFFICE
CERTIFICATE OF CORRECTION

PATENT NO. : 6,655,699 B2
DATED : December 2, 2003
INVENTOR(S) : Thomas Michael Grobbel It is certified that error appears in the above-identified patent and that said Letters Patent is hereby corrected as shown below:

Title page,
Item [75], Inventor,"Ortonville, MI" should read -- Ferndale, MI --.

Column 1,
Line 39, delete "in".
Line 50, delete "axially" and substitute -- axial -- therefor.
Line 54, delete "rock" and substitute -- rocker -- therefor.

Column 3,
Line 31, delete "equal angulary" and substitute -- equiangularly --.
Line 46, "toggle link 62" should be -- toggle link 60 --.
Line 49, delete "to".
Line 52, delete "pin" and substitute -- pins -- therefor.

Column 4,
Line 11, delete "being" and substitute -- bearing -- therefor.
Line 15, after "reacts" insert -- to --.
Line 55, delete "effects" and substitute -- affects --.
Line 59, delete "lubricate" and substitute -- lubricant --.

Column 5,
Line 40, delete "screw" and substitute -- screws -- therefor.
Line 52, delete "effecting" and substitute -- affecting -- therefor.
Line 54, delete "provide" and substitute -- provides --.
Line 58, delete "the" and substitute -- that -- therefor.

Column 6,
Line 2, delete "A" and substitute -- An -- therefor.
Line 24, delete "an" and substitute -- a -- therefor.
Line 39, after "surface" insert -- of --.
Line 66, delete "A" and substitute -- An -- therefor.

Column 7,
Line 38, delete "an" and substitute -- a -- therefor.

UNITED STATES PATENT AND TRADEMARK OFFICE
CERTIFICATE OF CORRECTION

PATENT NO. : 6,655,699 B2
DATED : December 2, 2003
INVENTOR(S) : Thomas Michael Grobbel It is certified that error appears in the above-identified patent and that said Letters Patent is hereby corrected as shown below:

<u>Column 8,</u>
Line 16, delete "A" and substitute -- An -- therefor.
Line 44, delete "an" and substitute -- a -- therefor.
Line 51, after "surface" insert -- of --.

Signed and Sealed this

Fifteenth Day of February, 2005

JON W. DUDAS
*Director of the United States Patent and Trademark Office*